(12) United States Patent
Kamoi et al.

(10) Patent No.: US 12,055,298 B2
(45) Date of Patent: Aug. 6, 2024

(54) GAS TURBINE

(71) Applicant: HONDA MOTOR CO., LTD., Tokyo (JP)

(72) Inventors: Yasuharu Kamoi, Wako (JP); Tomoki Shiota, Wako (JP); Manamu Nishimoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/472,516

(22) Filed: Sep. 22, 2023

(65) Prior Publication Data
US 2024/0110703 A1    Apr. 4, 2024

(30) Foreign Application Priority Data
Sep. 29, 2022    (JP) .................. 2022-156252

(51) Int. Cl.
*F23R 3/48* (2006.01)
*F02C 3/14* (2006.01)
*F23R 3/02* (2006.01)
*F23R 3/46* (2006.01)

(52) U.S. Cl.
CPC .................. *F23R 3/48* (2013.01); *F02C 3/14* (2013.01); *F23R 3/02* (2013.01); *F23R 3/46* (2013.01); *F23R 2900/03043* (2013.01)

(58) Field of Classification Search
CPC .... F02C 3/14; F23R 3/002; F23R 3/02; F23R 3/42; F23R 3/46; F23R 3/48; F23R 3/60; F23R 2900/03043
See application file for complete search history.

(56) References Cited

U.S. PATENT DOCUMENTS

| | | | | |
|---|---|---|---|---|
| 2003/0010014 A1* | 1/2003 | Bland | .................. | F01D 9/06 |
| | | | | 60/39.37 |
| 2015/0204543 A1* | 7/2015 | Kishida | .................. | F23R 3/48 |
| | | | | 60/752 |
| 2018/0298918 A1* | 10/2018 | Terauchi | .................. | F02C 3/06 |

FOREIGN PATENT DOCUMENTS

JP    63-61663 U    4/1988

* cited by examiner

*Primary Examiner* — Scott J Walthour
(74) *Attorney, Agent, or Firm* — Rankin, Hill & Clark LLP (57) ABSTRACT

A gas turbine includes a combustor, an air lead-out member, an outer peripheral cover portion, an inner peripheral cover portion, and a fuel supply unit. A lead-out port of the air lead-out member is located radially outward of one end portion of the combustor. The combustor has a guide wall portion which is formed so as to connect mutually-adjacent combustion cylinders and guides air from an air flow path to an inner space via a communication path. Through holes are formed in the outer peripheral surface of each of the combustion cylinders and open to the inner space to allow air in the inner space to flow into the downstream side of a combustion chamber.

6 Claims, 5 Drawing Sheets

GAS TURBINE

CROSS-REFERENCE TO RELATED APPLICATIONS

This application is based upon and claims the benefit of priority from Japanese Patent Application No. 2022-156252 filed on Sep. 29, 2022, the contents of which are incorporated herein by reference.

BACKGROUND OF THE INVENTION

Field of the Invention

The present invention relates to a gas turbine.

Description of the Related Art

A gas turbine includes a combustor, a fuel supply unit, an air lead-out member that leads out air supplied from a compressor to the combustor, an annular outer peripheral cover portion, and an annular inner peripheral cover portion (see, for example, JP S63-061663 U). The combustor includes, for example, a plurality of combustion cylinders arranged in an annular shape. The fuel supply unit supplies fuel to upstream portions of the combustion chambers of the plurality of combustion cylinders. Each of the combustion cylinders has an air flow inlet for causing air to flow into the upstream portion of the combustion chamber. The outer peripheral cover portion covers the combustor from a radially outward portion of the combustor. The inner peripheral cover portion covers the combustor from a radially inward portion of the combustor.

SUMMARY OF THE INVENTION

In the gas turbine described above, when a lead-out port of the air lead-out member is located radially outward of the one end portion of the combustor and an air flow inlet is located at another end portion of the combustor, the air led out from the air lead-out member flows through the air flow path between the combustor and the outer peripheral cover portion. That is, in the air flow path, air flows from one end portion of the combustor toward the other end portion thereof. Therefore, the outer peripheral surface of the combustor can be cooled by the air flowing through the air flow path.

In such a combustor, when the flow path width of the air flow path (a distance in the radial direction of the combustor) is set to be narrow, the flow velocity of the air flowing through the air flow path increases, so that the outer peripheral surface of the combustor can be efficiently cooled.

Further, for example, if a through hole for introducing the air flowing through the upstream portion (portion near the air introduction portion) of the air flow path to the downstream side of the upstream portion of the combustion chamber is formed in each combustion cylinder, the combustion gas in the combustion chamber can be diluted by the air introduced from the through hole into the combustion chamber.

However, as the flow path width of the air flow path is set to be narrower, the flow velocity of the air is more likely to change due to variations in component dimensions. Therefore, it is difficult to make the flow rate and the incident angle of the air flowing into the combustion chamber from the through hole uniform, and the temperature distribution of the combustion gas in the plurality of combustion chambers is more likely to vary. Further, in this case, since air is likely to stay in the inner space between the combustor and the inner peripheral cover member, the outer peripheral surface of the combustion cylinder may not be cooled in a well-balanced manner.

The present invention has the object of solving the aforementioned problem.

According to an aspect of the present invention, there is provided a gas turbine including a compressor, a combustor including a plurality of combustion cylinders arranged annularly, an air lead-out member configured to lead out air supplied from the compressor, to the combustor, an annular outer peripheral cover portion configured to cover the combustor from a radially outward side of the combustor, an annular inner peripheral cover portion configured to cover the combustor from a radially inward side of the combustor, and a plurality of fuel supply units configured to supply fuel to upstream portions of combustion chambers of the plurality of combustion cylinders, wherein the combustor includes a first end portion which is one end portion of the combustor in an axial direction of the combustor and a second end portion which is another end portion in the axial direction, a lead-out port of the air lead-out member is located radially outward of the first end portion, an air flow path is formed between the combustor and the outer peripheral cover portion, and causes the air led out from the air lead-out member to flow from the first end portion toward the second end portion, an inner space is formed between the combustor and the inner peripheral cover portion, and the air flows into the inner space from the air flow path via a communication path provided at the second end portion of the combustor, each of the plurality of combustion cylinders is provided with an air flow inlet located at the second end portion of the combustor, the air flow inlet being configured to cause the air having flowed through the air flow path to flow into each of the upstream portions of the combustion chambers, the combustor includes a guide wall portion configured to connect mutually-adjacent combustion cylinders among the plurality of combustion cylinders and guide the air from the air flow path to the inner space via the communication path, and a through hole is formed in an outer peripheral surface of each of the plurality of combustion cylinders, and opens to the inner space and allows the air in the inner space to flow into a downstream side of each of the combustion chambers.

According to the present invention, the air led out from the air lead-out member flows into the inner space via the air flow path and the communication path, and then is led from the through hole to the downstream side of the combustion chamber. Accordingly, since it is possible to suppress the air from staying in the inner space (since it is possible to increase the flow rate of the air flowing through the inner space), the outer circumferential surfaces of the combustion cylinders can be efficiently cooled without increasing the flow rate of the air led out from the combustor. In addition, even in a case where the flow path width of the air flow path is set to be relatively narrow, the flow velocity of the air decreases until the air is guided to the inner space. Therefore, even if there are variations in component dimensions, the flow rate and the incident angle of the air flowing into the combustion chambers from the through holes are unlikely to change. Therefore, the variation in the temperature distribution of the plurality of combustion chambers can be suppressed.

The above and other objects, features, and advantages of the present invention will become more apparent from the following description when taken in conjunction with the accompanying drawings, in which a preferred embodiment of the present invention is shown by way of illustrative example.

DETAILED DESCRIPTION OF THE INVENTION

Figure 1:
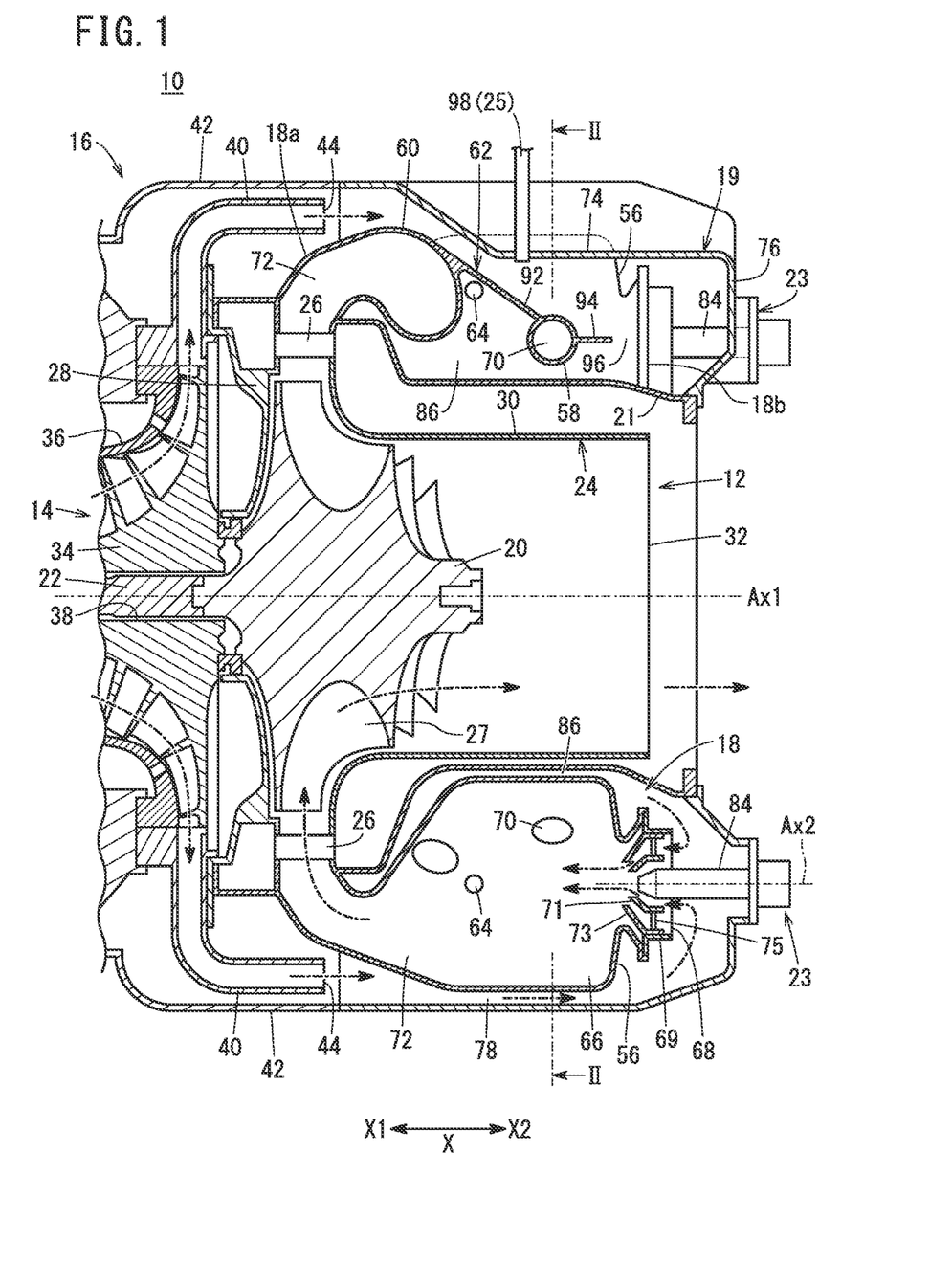
FIG. 1 is a vertical cross-sectional view of a gas turbine according to an embodiment of the present invention.

As shown in FIG. 1, a gas turbine 10 according to an embodiment of the present invention is used, for example, as a power source of a generator. The gas turbine 10 may be used as a power source of an aircraft or a ship. The gas turbine 10 includes a turbine portion 12, a compressor 14, a diffuser 16, a combustor 18, a casing member 19, an inner peripheral cover portion 21, a plurality of fuel supply units 23, and an auxiliary device member 25.

The turbine portion 12 includes a turbine 20, a shaft 22, and a turbine housing 24. The turbine 20 is made of a metal material having heat resistance. The turbine 20 is configured as a radial turbine. The turbine 20 has a plurality of blades 27 for receiving combustion gas introduced from a radially outward side.

The shaft 22 extends in one direction (the direction of arrow X). One end portion (an end portion in the direction of arrow X1) of the shaft 22 is coupled to, for example, an unillustrated output shaft. The output shaft may be a rotating shaft of a generator, a rotating shaft of a propeller of an aircraft or a ship, or the like. When the gas turbine 10 is used as a jet engine or the like, the output shaft may not be connected to one end portion of the shaft 22. Another end portion (an end portion in the direction of arrow X2) of the shaft 22 is coupled to the turbine 20. An axis of the shaft 22 is located on a rotation axis of the turbine 20.

The turbine housing 24 accommodates the turbine 20. The turbine housing 24 covers the turbine 20 from a radially outward side. The turbine housing 24 includes a turbine nozzle 26, a first housing 28 and a second housing 30. The turbine nozzle 26 is formed in an annular shape. The turbine nozzle 26 is disposed so as to cover the blades 27 of the turbine 20 from the radially outward side. The turbine nozzle 26 guides the combustion gas from the combustor 18, to the blades 27 of the turbine 20. The turbine nozzle 26 is supported by the first housing 28 and the second housing 30.

The first housing 28 is formed in an annular shape so as to cover a portion (one end portion of the turbine 20) of the turbine 20 in the direction of arrow X1 relative to the turbine nozzle 26. The second housing 30 is formed in an annular shape so as to cover a portion (another end portion of the turbine 20) of the turbine 20 in the direction of arrow X2 relative to the turbine nozzle 26. The second housing 30 extends in the direction of arrow X2 compared to the other end portion of the turbine 20. An exhaust port 32 facing in the direction of arrow X2 is formed at an extending end of the second housing 30. The exhaust port 32 discharges the combustion gas in the turbine housing 24 to outside.

The compressor 14 is configured as, for example, a centrifugal compressor. The compressor 14 includes a compressor wheel 34 and a shroud case 36 that accommodates the compressor wheel 34. An insertion hole 38 into which the shaft 22 is inserted is formed in the compressor wheel 34.

A rotation axis of the compressor wheel 34 is located on the axis of the shaft 22. The compressor wheel 34 is coupled to the shaft 22 for rotation together with the shaft 22. The shaft 22 transmits the rotational force of the turbine 20 to the compressor wheel 34 to rotate the compressor wheel 34.

The shroud case 36 covers the compressor wheel 34. The shroud case 36 is provided with an opening (not shown) for allowing external air to flow into the shroud case 36. The air inside the shroud case 36 is compressed by the rotation of the compressor wheel 34.

The diffuser 16 includes an air lead-out member 40 that leads out the air (compressed air) supplied from the compressor 14 to the combustor 18, and a diffuser housing 42 that covers the air lead-out member 40. The air lead-out member 40 is located radially outward of the compressor wheel 34. The air lead-out member 40 leads the air supplied from the compressor 14 in the direction of arrow X2. A lead-out port 44 of the air lead-out member 40 is oriented in the direction of arrow X2.

The combustor 18 is formed of a metal material having heat resistance, in an annular shape. An axis Ax1 of the combustor 18 is disposed coaxially with the turbine 20 and the shaft 22. The combustor 18 has a first end portion 18a which is one end portion (an end portion in the direction of arrow X1) in the axial direction of the combustor 18 and a second end portion 18b which is another end portion (an end portion in the direction of arrow X2) in the axial direction.

Figure 2:
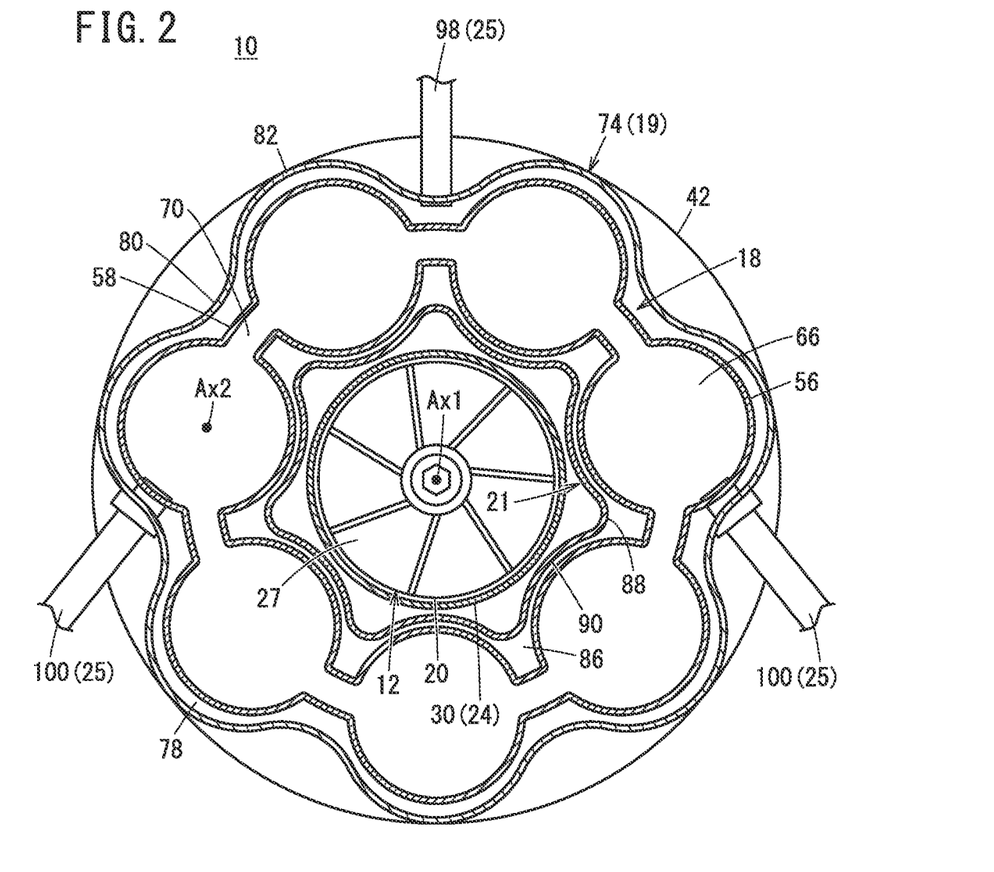
FIG. 2 is a cross-sectional view taken along line II-II of FIG. 1.
Figure 3:
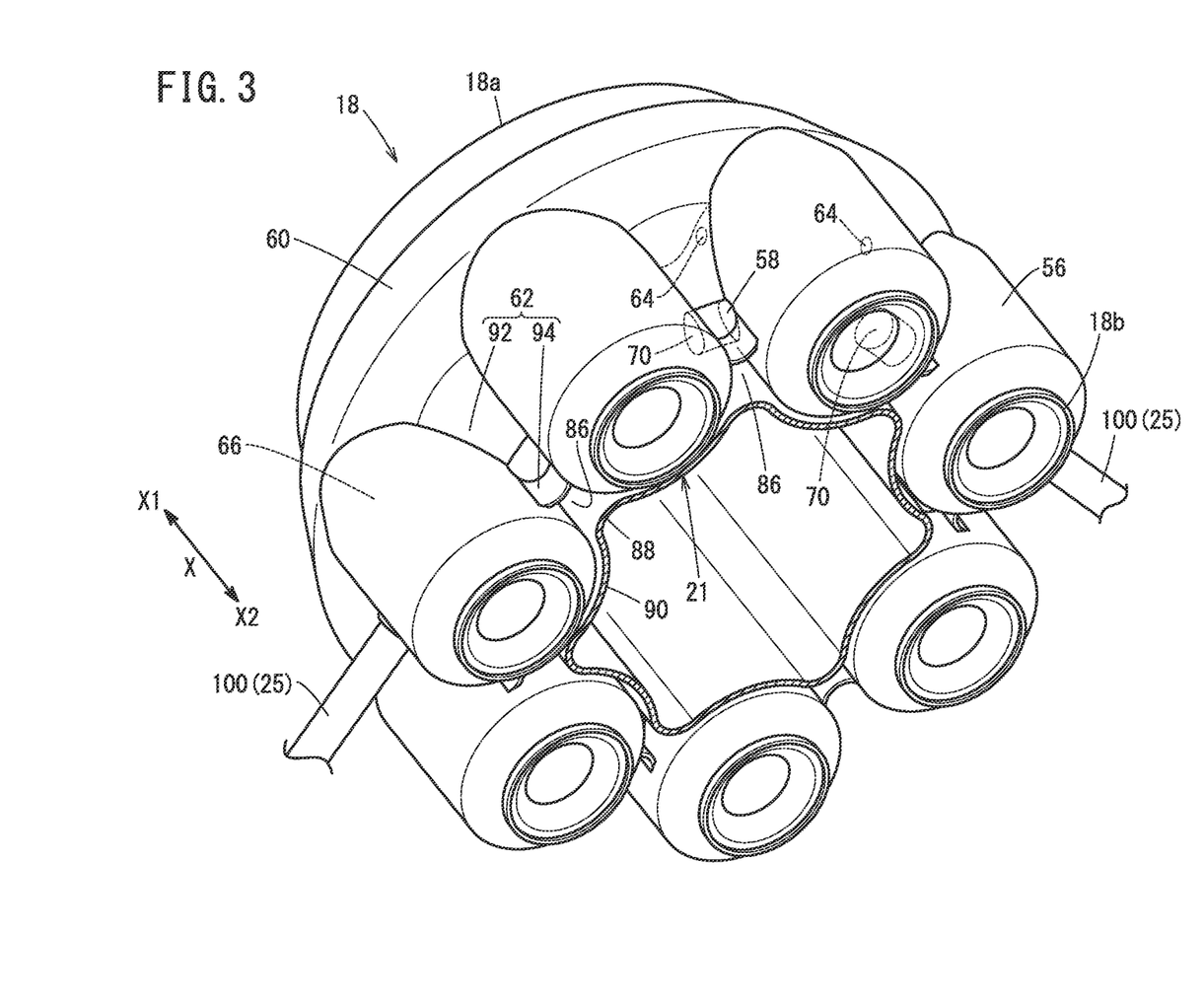
FIG. 3 is a partial cross-sectional perspective view of a combustor of FIG. 1.

As shown in FIGS. 1 to 3, the combustor 18 is formed in an annular shape. The lead-out port 44 of the air lead-out member 40 is located radially outward of the first end portion 18a of the combustor 18 (see FIG. 1). The combustor 18 includes a plurality of combustion cylinders 56, a plurality of communication pipes 58, an annular lead-out portion 60, a plurality of guide wall portions 62, and a plurality of through holes 64 (dilution holes).

The plurality of combustion cylinders 56 extend in the axial direction (the direction of arrow X) of the combustor 18 (see FIGS. 1 and 3). In FIG. 2, the plurality of combustion cylinders 56 are annularly arranged. More specifically, in the example of FIG. 2, seven combustion cylinders 56 are arranged at equal intervals around the axis Ax1 of the combustor 18. The number of the combustion cylinders 56 is not limited to seven. The combustion cylinder 56 is formed in a cylindrical shape.

As shown in FIGS. 1 and 3, the annular lead-out portion 60 is connected to one end portion (an end portion in the direction of arrow X1) of each of the combustion cylinders 56. At another end portion (an end portion in the direction of arrow X2) of each of the combustion cylinders 56, a swirling flow generating blade portion 69 having an air flow inlet 68 for allowing air to flow into the upstream portion of a combustion chamber 66 inside each combustion cylinder 56 is provided. The air flow inlet 68 is located at the second end portion 18b of the combustor 18. The air flow inlet 68 faces in the direction of arrow X2. The hole diameter (diameter) of the air flow inlet 68 is smaller than the inner diameter of the intermediate portion in the extending direction of the combustion cylinders 56.

In FIG. 1, the swirling flow generating blade portion 69 includes an inner tubular body 71, an outer tubular body 73, and a swirling blade 75. A distal end portion of an injector 84, which will be described later, of the fuel supply unit 23 is positioned inside the inner tubular body 71. A space through which air flows is formed between the inner tubular body 71 and the distal end portion of the injector 84. A space through which air flows is formed between the inner tubular body 71 and the outer tubular body 73. The swirling blade 75 generates a swirl flow in the air flowing into the combustion chamber 66 from the air flow inlet 68. The swirling blade 75 is provided between the inner tubular body 71 and the outer tubular body 73. Although not shown in detail, the swirling blade 75 is also provided between the inner tubular body 71 and the distal end portion of the injector 84.

In FIGS. 2 and 3, each of the communication pipes 58 connects the combustion cylinders 56 adjacent to each other in the circumferential direction of the combustor 18. An inner hole 70 of each of the communication pipes 58 allows the combustion chambers 66 of the combustion cylinders 56 adjacent to each other in the circumferential direction of the combustor 18 to communicate with each other (see FIG. 2). The communication pipes 58 are located at intermediate portions in the extending direction of the combustion cylinders 56 (FIGS. 2 and 3).

The annular lead-out portion 60 is formed in an annular shape (see FIGS. 1 and 3). In FIG. 1, the annular lead-out portion 60 is connected to the turbine nozzle 26. The annular lead-out portion 60 has an annular lead-out flow path 72 communicating with the plurality of combustion chambers 66. The lead-out flow path 72 leads the combustion gas generated in the plurality of combustion chambers 66 to the turbine nozzle 26. Specific configurations of the plurality of guide wall portions 62 and the through holes 64 will be described later.

The casing member 19 includes an outer peripheral cover portion 74 and an end cover portion 76. The outer peripheral cover portion 74 is formed in an annular shape (see FIG. 2). The outer peripheral cover portion 74 covers the combustor 18 from a radially outward side of the combustor 18.

In FIG. 1, one end portion (an end portion in the direction of arrow X1) of the outer peripheral cover portion 74 is coupled to the diffuser housing 42. Another end portion (an end portion in the direction of arrow X2) of the outer peripheral cover portion 74 is located further in the direction of arrow X2 than the second end portion 18b of the combustor 18. An air flow path 78 is formed between the combustor 18 and the outer peripheral cover portion 74. The air flow path 78 causes the air led out from the air lead-out member 40 to flow from the first end portion 18a to the second end portion 18b of the combustor 18. The air flow path 78 extends annularly.

In FIG. 2, the outer peripheral cover portion 74 is formed such that outer peripheral concave portions 80 and outer peripheral convex portions 82 are alternately and continuously arranged in the circumferential direction of the combustor 18. The outer peripheral concave portions 80 are recessed radially inward of the combustor 18 so as to enter between the combustion cylinders 56 adjacent to each other. The outer peripheral concave portions 80 protrude radially inward of the combustor 18 in an arc shape. The outer peripheral convex portions 82 protrude radially outward of the combustor 18 along the outer circumferential surfaces of the plurality of combustion cylinders 56. The outer peripheral convex portions 82 protrude radially outward of the combustor 18 in an arc shape. Accordingly, the flow path width of the air flow path 78 (the width in the radial direction of the combustor 18) can be set to be narrow.

As shown in FIG. 1, the end cover portion 76 is formed in an annular shape. The end cover portion 76 covers the combustor 18 from a side in the direction of arrow X2. The end cover portion 76 extends radially inward of the combustor 18 from an end portion of the outer peripheral cover portion 74 in the direction of arrow X2. The end cover portion 76 covers the air flow inlet 68 of each combustion cylinder 56.

The fuel supply unit 23 is provided in each of the plurality of combustion cylinders 56. That is, the fuel supply units 23 are provided in the same number as the combustion cylinders 56. Each of the fuel supply units 23 includes the injector 84. A distal end portion of the injector 84 is inserted into the combustion chamber 66 from the air flow inlet 68 of the combustion cylinder 56. The center line (fuel injection port) of the injector 84 is located on the axis Ax2 of the combustion cylinder 56. The injector 84 extends along the axial direction (the direction of arrow X) of the combustion cylinder 56. The injector 84 injects fuel into the combustion chamber 66. The injector 84 is attached to the end cover portion 76.

The inner peripheral cover portion 21 is formed in an annular shape (see FIG. 2). The inner peripheral cover portion 21 covers the combustor 18 from the radially inward side. One end portion (an end portion in the direction of arrow X1) of the inner peripheral cover portion 21 is connected to the annular lead-out portion 60. Another end portion (an end portion in the direction of arrow X2) of the inner peripheral cover portion 21 is coupled to the end cover portion 76. An inner space 86 into which air flows from the air flow path 78 via a communication path 96 provided in the second end portion 18b of the combustor 18 is formed between the combustor 18 and the inner peripheral cover portion 21. The inner space 86 extends annularly.

In FIG. 2, the inner peripheral cover portion 21 is formed such that inner peripheral concave portions 88 and inner peripheral convex portions 90 are alternately and continuously arranged in the circumferential direction of the combustor 18. The inner peripheral concave portions 88 are recessed radially outward of the combustor 18 so as to enter between the combustion cylinders 56 adjacent to each other. The inner peripheral convex portions 90 protrude radially inward of the combustor 18 along the outer circumferential surfaces of combustion cylinders 56. The inner peripheral convex portions 90 protrude radially inward of the combustor 18 in an arc shape.

Figure 4:
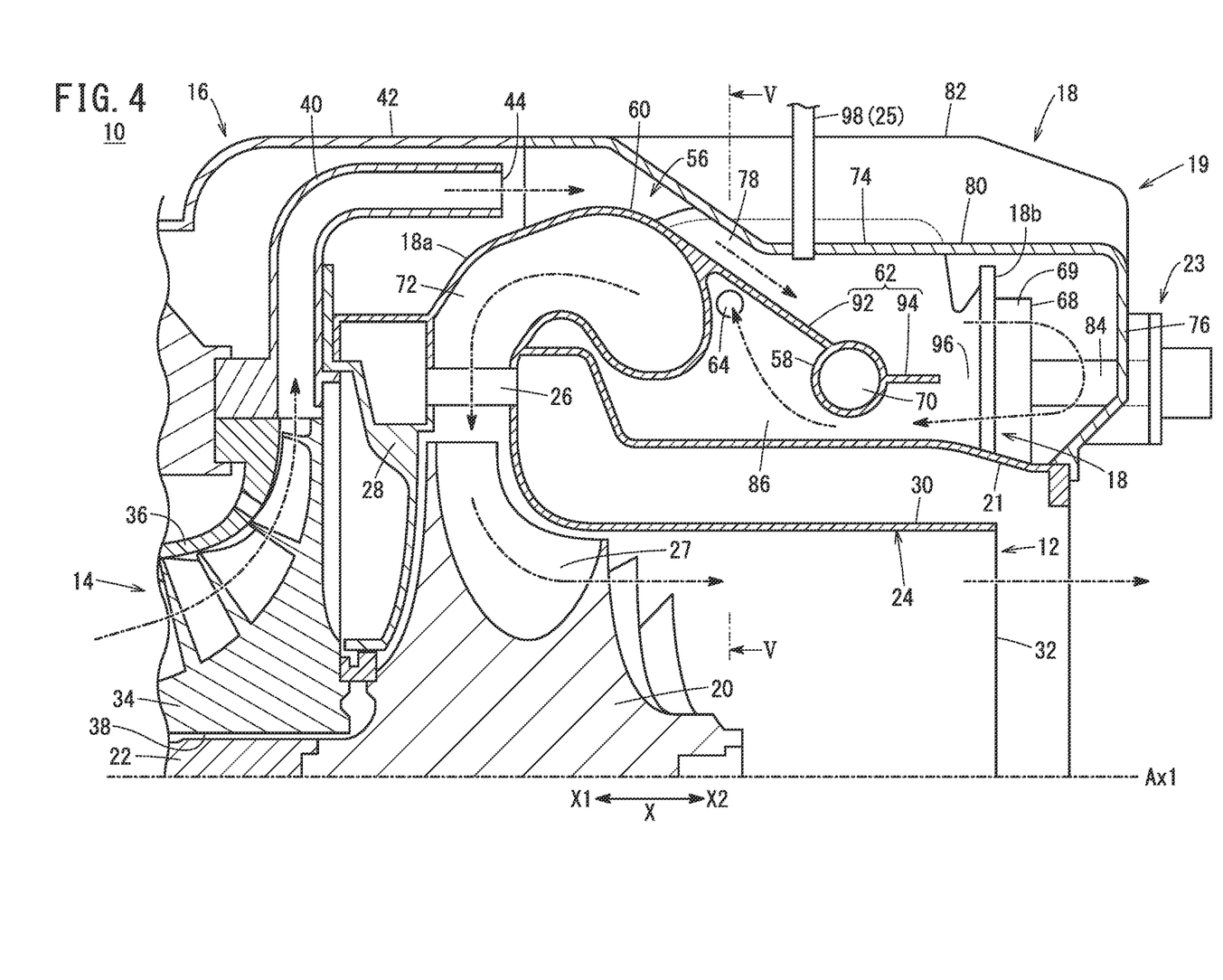
FIG. 4 is an enlarged view of FIG. 1.

As shown in FIGS. 3 and 4, the guide wall portions 62 are provided so as to connect the combustion cylinders 56 adjacent to each other in the circumferential direction of the combustor 18. That is, each of the guide wall portions 62 is provided between the combustion cylinders 56 adjacent to each other in the circumferential direction of the combustor 18. The guide wall portion 62 guides air from the air flow path 78 to the inner space 86 via the communication path 96 (see FIG. 4).

The guide wall portion 62 includes a first wall portion 92 and a second wall portion 94. The first wall portion 92 extends from the communication pipe 58 toward the first end portion 18a (in the direction of arrow X1) of the combustor 18. The first wall portion 92 extends so as to be inclined radially outward of the combustor 18, viewed in the direction of arrow X1. An extending end portion of the first wall portion 92 is connected to the annular lead-out portion 60. When viewed in the axial direction of the combustor 18, the first wall portion 92 protrudes radially outward of the combustor 18 in an arc shape (see FIG. 5). Note that the cross section of the first wall portion 92 may protrude radially inward of the combustor 18 in an arc shape.

As shown in FIGS. 3 and 4, the second wall portion 94 extends from the communication pipe 58 toward the second end portion 18b of the combustor 18 (in the direction of arrow X2). The extending end portion of the second wall portion 94 is located at a position shifted in the direction of arrow X1 from the other end portion of the combustion cylinder 56. The second wall portion 94 protrudes radially inward of the combustor 18 in an arc shape when viewed in the axial direction of the combustor 18 (see FIG. 3). Note that the cross section of the second wall portion 94 may protrude radially outward of the combustor 18 in an arc shape.

In FIG. 4, the communication pipes 58 and the guide wall portions 62 partition the space between the outer peripheral cover portion 74 and the inner peripheral cover portion 21 into the air flow path 78 located radially outward of the combustor 18 and the inner space 86 located radially inward of the combustor 18. In this case, the combustor 18 has the communication path 96 that allows the air flow path 78 and the inner space 86 to communicate with each other at the second end portion 18b (the end portion in the direction of arrow X2) of the combustor 18.

Figure 5:
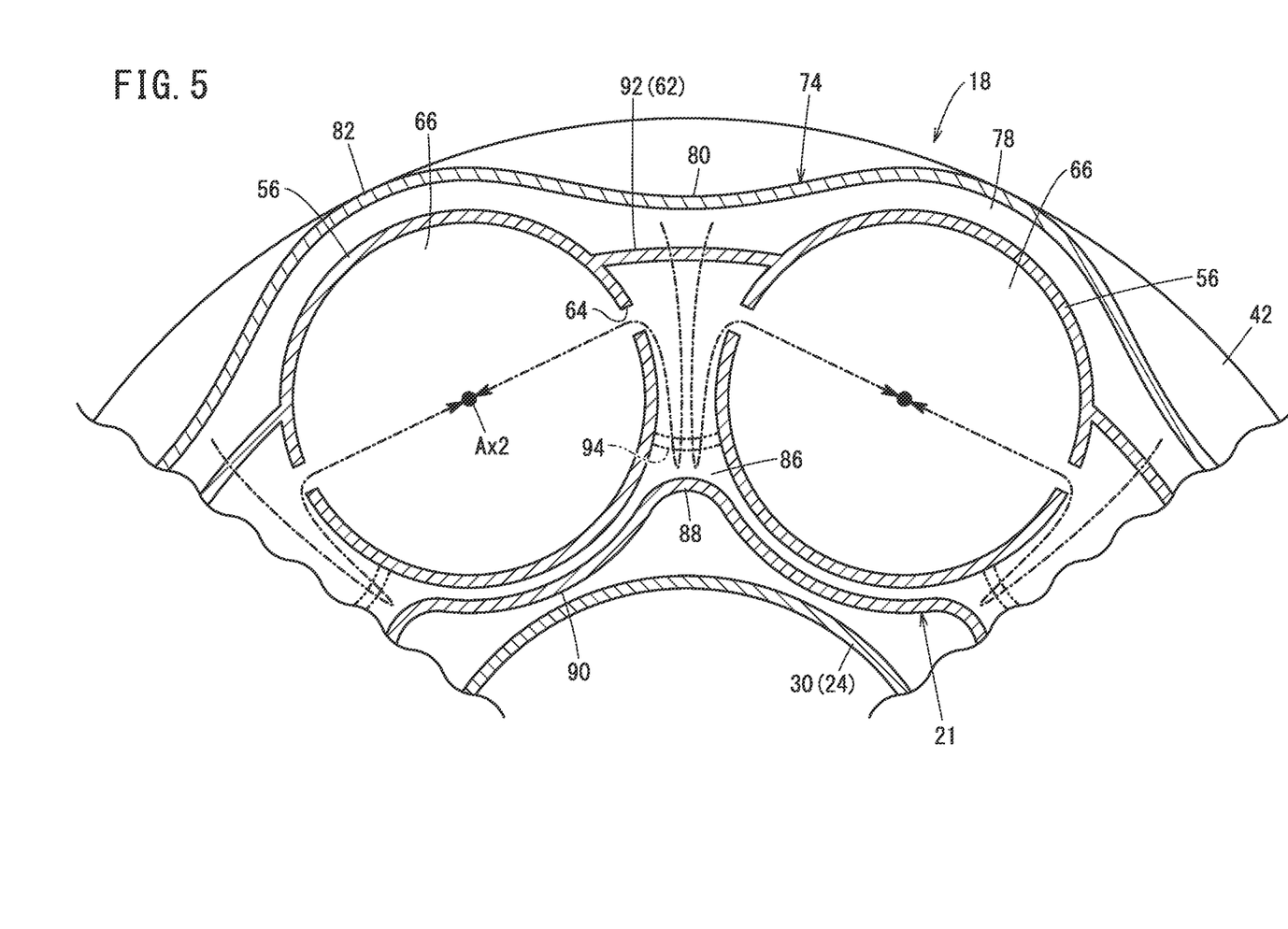
FIG. 5 is a cross-sectional view taken along line V-V of FIG. 4.

As shown in FIGS. 4 and 5, two through holes 64 are provided for each combustion cylinder 56. These through holes 64 guide the air in the inner space 86 to the downstream side of the combustion chamber 66. The through holes 64 are located between the first wall portions 92 and the inner peripheral cover portion 21. The through holes 64 are adjacent to a boundary portion between the first wall portions 92 and the annular lead-out portion 60. Each of the through holes 64 is formed at a position adjacent to the annular lead-out portion 60 on the outer peripheral surface of the combustion cylinder 56 (the end portion in the direction of arrow X1). In FIG. 4, the through holes 64 are located in the direction of arrow X1 relative to the communication pipes 58. The through holes 64 are located radially outward of the combustor 18 relative to the communication pipes 58.

As shown in FIG. 5, the through holes 64 open radially inward of the combustion cylinders 56. In other words, each of the through holes 64 opens toward the axis Ax2 of the combustion cylinder 56. In the axial direction of the combustion cylinder 56, the two through holes 64 are at the same height position. The two through holes 64 are disposed so as to face each other across the axis Ax2 of the combustion cylinder 56. The two through holes 64 are positioned so as to be shifted by 180° in the circumferential direction of the combustion cylinder 56.

As shown in FIGS. 1 and 2, the auxiliary device member 25 includes one sensor 98 and two ignition devices 100. The sensor 98 detects a physical quantity of the air flowing through the air flow path 78. More specifically, the sensor 98 is, for example, a pressure sensor that detects the pressure of the air flowing through the air flow path 78. The sensor 98 extends in one direction. The sensor 98 is attached to one of the outer peripheral concave portions 80 of the outer peripheral cover portion 74 such that a distal end thereof is exposed to the air flow path 78. The sensor 98 extends in the radial direction of the combustor 18 in a state of being attached to the outer peripheral cover portion 74. The sensor 98 is located in the direction of arrow X1 from the communication pipe 58. However, the mounting position of the sensor 98 can be appropriately set in the axial direction of the combustor 18.

In FIG. 2, each of the ignition devices 100 is an igniter that discharges in the combustion chamber 66. Each of the ignition devices 100 extends in its own direction (or, one of the ignition devices 100 extends in one direction). Each of the ignition devices 100 is attached to one of the outer peripheral concave portions 80 of the outer peripheral cover portion 74 such that a distal end thereof is exposed to the combustion chamber 66. The ignition devices 100 are attached to the outer peripheral concave portions 80 different from the outer peripheral concave portion 80 to which the sensor 98 is attached. Further, the two ignition devices 100 are attached to the outer peripheral concave portions 80 different from each other. In this case, the two ignition devices 100 are attached to the outer peripheral cover portion 74 so as to be located at positions farthest from each other in the circumferential direction of the combustor 18.

Each of the ignition devices 100 extends so as to be inclined with respect to the radial direction of the combustor 18 in a state of being attached to the outer peripheral cover portion 74. The tip of the ignition device 100 faces the axis Ax2 of the combustion cylinder 56. The ignition device 100 is disposed such that the position of the ignition device 100 corresponds to the position of the communication pipe 58 in the axial direction of the combustor 18. The number of ignition devices 100 may be one. However, when two ignition devices 100 are provided, a mixture gas (fuel and air) in the combustion chambers 66 can be ignited even if one of the ignition devices 100 fails.

As shown in FIGS. 1 and 4, in the gas turbine 10 described above, the air (compressed air) supplied from the compressor 14 is led out from the lead-out port 44 of the air lead-out member 40 to the air flow path 78. The air led out from the lead-out port 44 to the air flow path 78 flows along the guide wall portions 62 and the combustion cylinders 56 to the second end portion 18b of the combustor 18 in the direction of arrow X2, and then hits the end cover portion 76 in the communication path 96 to change its direction by 180° and is guided to the inner space 86. At this time, a portion of the air flows into the combustion chambers 66 through the air flow inlets 68 (see FIG. 1).

In each of the combustion chambers 66, the air flowing in from the air flow inlet 68 and the fuel injected from the injector 84 are mixed. At startup of the gas turbine 10, the ignition devices 100 discharge in the combustion chambers 66. As a result, flame is generated in the combustion chambers 66. The flame generated in the combustion chambers 66 by the ignition devices 100 is transmitted through the inner holes 70 of the communication pipes 58 to the combustion chambers 66 of the combustion cylinders 56 to which the ignition device 100 is not attached (see FIG. 2). Thus, flames can be generated in the combustion chambers 66 of all the combustion cylinders 56. In each of the combustion chambers 66, a portion (central portion) on the axis Ax2 of the combustion cylinder 56 has highest temperature.

In the present embodiment, the air guided to the inner space 86 flows into each of the combustion chambers 66 from the two through holes 64. At this time, as shown in FIG. 5, the air flowing into each of the combustion chambers 66 from the two through holes 64 collides (head-on collision) on the axis Ax2 of the combustion cylinder 56 on the downstream side of the combustion chamber 66. As a result, the air having a relatively low temperature can remain in the vicinity of the axis Ax2 portion (in the vicinity of the center) of the combustion cylinder 56. Therefore, the combustion gas in the central portion of the combustion chamber 66 can be diluted in a well-balanced manner. A portion of the air that has flowed into the combustion chamber 66 from the through hole 64 and collided head-on, flows toward the upstream side of the combustion chamber 66 and is mixed with the fuel and used for combustion. Therefore, the air required for combustion can be efficiently supplied to the combustion chamber 66.

Further, the combustion chambers 66 are also cooled by the air flowing outside the combustor 18. Specifically, as shown in FIG. 4, the air flowing through the air flow path 78 cools the outer peripheral surfaces of the combustion cylinders 56. In the present embodiment, since the outer peripheral cover portion 74 has a concave and convex shape corresponding to the shape of the annularly arranged combustion cylinders 56, the flow path width of the air flow path 78 is set to be relatively narrow (see FIG. 2). Therefore, the flow velocity of the air flowing through the air flow path 78 is increased, and the outer peripheral surfaces of the combustion cylinders 56 can be efficiently cooled.

Further, in the present embodiment, since the air in the inner space 86 where the air is likely to stay flows into the combustion chambers 66 from the through holes 64, the air is unlikely to stay in the inner space 86. Therefore, the outer peripheral surfaces of the combustion cylinders 56 can be efficiently cooled by the air flowing through the inner space 86.

The combustion gas in each of the combustion chambers 66 merges in the lead-out flow path 72 of the annular lead-out portion 60 and flows toward the turbine 20 via the turbine nozzle 26. Thus, the turbine 20 rotates. The rotational force of the turbine 20 is transmitted to the compressor wheel 34 via the shaft 22.

According to the present embodiment, the following effects are obtained.

According to the present embodiment, the air led out from the air lead-out member 40 flows into the inner space 86 via the air flow path 78 and the communication path 96, and then is introduced from the through holes 64 to the downstream side of the combustion chambers 66. Accordingly, since it is possible to suppress the air from staying in the inner space 86 (since it is possible to increase the flow rate of the air flowing through the inner space 86), the outer circumferential surfaces of the combustion cylinders 56 can be efficiently cooled without increasing the flow rate of the air led out from the combustor 18. Further, even in a case where the flow path width of the air flow path 78 is set to be relatively narrow, the flow velocity of the air decreases until the air is guided to the inner space 86. Therefore, even if there are variations in component dimensions, the flow rate and the incident angle of the air flowing into the combustion chambers 66 from the through holes 64 are unlikely to change. Therefore, the variation in the temperature distribution of the plurality of combustion chambers 66 can be suppressed.

The through holes 64 open radially inward of each of the plurality of combustion cylinders 56.

According to such a configuration, the combustion gas in the central portion of the combustion chamber 66 can be diluted in a well-balanced manner.

Two through holes 64 are formed in each of the plurality of combustion cylinders 56. The two through holes 64 are disposed so as to face each other across the axis Ax2 of the combustion cylinder 56.

According to such a configuration, since it is possible to cause the air flowing in from the two through holes 64 to collide with each other in the central portion of the combustion chamber 66, it is possible to dilute the combustion gas in the central portion of the combustion chamber 66 in a well-balanced manner.

The combustor 18 has a plurality of communication pipes 58 for allowing the combustion chambers 66 of the combustion cylinders 56 adjacent to each other to communicate with each other. Each of the guide wall portions 62 includes the first wall portion 92 extending from each of the plurality of communication pipes 58 toward the first end portion 18*a* and the second wall portion 94 extending from each of the plurality of communication pipes 58 toward the second end portion 18*b*.

According to such a configuration, the rigidity of the combustor 18 can be improved.

The outer peripheral cover portion 74 is formed such that the outer peripheral concave portion 80 recessed radially inward of the combustor 18 so as to enter between the combustion cylinders 56 adjacent to each other and the outer peripheral convex portion 82 protruding radially outward of the combustor 18 so as to extend along the outer peripheral surface of the combustion cylinder 56 are alternately and continuously arranged in the circumferential direction of the combustor 18.

According to such a configuration, the flow path width of the air flow path 78 can be easily set to be narrow. As a result, the flow velocity of the air flowing through the air flow path 78 can be increased, so that the outer peripheral surfaces of the combustion cylinders 56 can be efficiently cooled. Further, since the air flows into the combustion chambers 66 from the through holes 64 via the inner space 86, the flow velocity of the air flowing through the inner space 86 can be increased, so that the outer peripheral surfaces of the combustion cylinders 56 can be efficiently cooled.

The guide wall portion 62 protrudes in an arc shape toward a radially inward side or a radially outward side of the combustor 18 when viewed in the axial direction of the combustor 18.

According to such a configuration, it is possible to effectively alleviate the thermal stress generated in the boundary portion between the guide wall portion 62 and the combustion cylinders 56.

The present embodiment discloses the following contents.

The present embodiment discloses the gas turbine (10) including the compressor (14), the combustor (18) including the plurality of combustion cylinders (56) arranged annularly, the air lead-out member (40) configured to lead out air supplied from the compressor, to the combustor, the annular outer peripheral cover portion (74) configured to cover the combustor from the radially outward side of the combustor, the annular inner peripheral cover portion (21) configured to cover the combustor from a radially inward side of the combustor, and the plurality of fuel supply units (23) configured to supply fuel to upstream portions of combustion chambers (66) of the plurality of combustion cylinders, wherein the combustor includes the first end portion (18*a*) which is one end portion of the combustor in the axial direction of the combustor and the second end portion (18*b*) which is another end portion in the axial direction, the lead-out port (44) of the air lead-out member is located radially outward of the first end portion, the air flow path (78) is formed between the combustor and the outer peripheral cover portion, and causes the air led out from the air lead-out member to flow from the first end portion toward the second end portion, the inner space (86) is formed between the combustor and the inner peripheral cover portion, and the air flows into the inner space from the air flow path via the communication path (96) provided at the second end portion of the combustor, each of the plurality of combustion cylinders is provided with the air flow inlet (68) located at the second end portion of the combustor, the air flow inlet being configured to cause the air having flowed through the air flow path to flow into each of the upstream portions of the combustion chambers, the combustor includes the guide wall portion (62) configured to connect mutually-adjacent combustion cylinders among the plurality of combustion cylinders and guide the air from the air flow path to the inner space via the communication path, and the through hole (64) is formed in the outer peripheral surface of each of the plurality of combustion cylinders, and opens to the inner space and allows the air in the inner space to flow into the downstream side of each of the combustion chambers.

In the gas turbine described above, the through hole may open radially inward of each of the plurality of combustion cylinders.

In the gas turbine described above, two of the through holes may be formed in each of the plurality of combustion cylinders, and the two through holes may be disposed so as to face each other across an axis of each of the plurality of combustion cylinders.

In the above-described gas turbine, the combustor may include the plurality of communication pipes (58) configured to allow the combustion chambers of the combustion cylinders adjacent to each other to communicate with each other, and the guide wall portion may include the first wall portion (92) extending from each of the plurality of communication pipes toward the first end portion of the combustor, and the second wall portion (94) extending from each of the plurality of communication pipes toward the second end portion of the combustor.

In the above-described gas turbine, the outer peripheral cover portion may include the outer peripheral concave portions (80) and the outer peripheral convex portions (82), and be formed in a manner so that the outer peripheral concave portions recessed radially inward of the combustor so as to enter between the combustion cylinders adjacent to each other and the outer peripheral convex portions protruding radially outward of the combustor so as to extend along the outer peripheral surfaces of the plurality of combustion cylinders are alternately and continuously arranged in the circumferential direction of the combustor.

In the gas turbine described above, the guide wall portion may protrude in an arc shape toward the radially inward side or the radially outward side of the combustor when viewed in the axial direction.

Moreover, it should be noted that the present invention is not limited to the disclosure described above, and various configurations may be adopted therein without departing from the essence and gist of the present invention.

The invention claimed is:

1. A gas turbine comprising:
a compressor;
a combustor including a plurality of combustion cylinders arranged annularly;
an air lead-out member configured to lead out air supplied from the compressor to the combustor;
an annular outer peripheral cover portion configured to cover the combustor from radially outward of the combustor;
an annular inner peripheral cover portion configured to cover the combustor from radially inward of the combustor; and
a plurality of fuel supply units configured to supply fuel to upstream portions of combustion chambers of the plurality of combustion cylinders,
wherein the combustor includes a first end portion which is at a first axial end of the combustor along an axis of the combustor and a second end portion which is at a second axial end of the combustor along the axis,
a lead-out port of the air lead-out member is located radially outward of the first end portion,
an air flow path is formed between the combustor and the outer peripheral cover portion and causes the air led out from the air lead-out member to flow from the first end portion toward the second end portion,
an inner space is formed between the combustor and the inner peripheral cover portion, and the air flows into the inner space from the air flow path via a communication path provided at the second end portion of the combustor,
each of the plurality of combustion cylinders is provided with an air flow inlet located at the second end portion of the combustor, the air flow inlet being configured to cause the air which has flowed through the air flow path to flow into each of the upstream portions of the combustion chambers,
the combustor includes a guide wall portion configured to connect mutually-adjacent combustion cylinders among the plurality of combustion cylinders and guide the air from the air flow path to the inner space via the communication path, and
at least one through hole is formed in an outer peripheral surface of each of the plurality of combustion cylinders, and opens to the inner space and allows the air in the inner space to flow into a downstream side of each of the combustion chambers.

2. The gas turbine according to claim 1, wherein the at least one through hole opens radially inward of each of the plurality of combustion cylinders.

3. The gas turbine according to claim 2, wherein the at least one through hole comprises two through holes formed in each of the plurality of combustion cylinders, and
the two through holes are disposed so as to face each other across the axis of each of the plurality of combustion cylinders.

4. The gas turbine according to claim 1, wherein the combustor includes a plurality of communication pipes configured to allow the combustion chambers of the combustion cylinders adjacent to each other to communicate with each other, and
the guide wall portion includes:
a first wall portion extending from each of the plurality of communication pipes toward the first end portion of the combustor; and
a second wall portion extending from each of the plurality of communication pipes toward the second end portion of the combustor.

5. The gas turbine according to claim 1, wherein the outer peripheral cover portion includes outer peripheral concave portions and outer peripheral convex portions, and is formed such that the outer peripheral concave portions are recessed radially inward of the combustor so as to enter between the mutually-adjacent combustion cylinders, and the outer peripheral convex portions protrude radially outward of the combustor so as to extend along the outer peripheral surfaces of the plurality of combustion cylinders, the plurality of combustion cylinders, the outer peripheral concave portions, and the outer peripheral convex portions being alternately and continuously arranged in a circumferential direction of the combustor.

6. The gas turbine according to claim 1, wherein the guide wall portion protrudes in an arc shape radially inward or radially outward when viewed in a direction along the axis.

* * * * *